United States Patent [19]

Boutni et al.

[11] Patent Number: 4,931,503

[45] Date of Patent: Jun. 5, 1990

[54] COMPOSITION

[75] Inventors: Omar M. Boutni, Mt. Vernon; Linda H. Nelson; Dwight J. Patterson, both of Evansville, all of Ind.; Charles F. Pratt, AC Bergen Op Zoom, Netherlands; Herman B. Savenije, LW Bergen Op Zoom, Netherlands

[73] Assignee: General Electric Company, Mt. Vernon, Ind.

[21] Appl. No.: 291,465

[22] Filed: Dec. 28, 1988

[51] Int. Cl.$^5$ .............................................. C08L 69/00
[52] U.S. Cl. ...................................... 525/67; 524/164; 524/504; 525/148
[58] Field of Search .................... 525/67, 148, 902; 524/504, 164

[56] References Cited

U.S. PATENT DOCUMENTS

| | | | |
|---|---|---|---|
| 4,696,972 | 9/1987 | Bourland | 525/67 |
| 4,767,818 | 8/1988 | Boutni | 524/505 |
| 4,786,686 | 11/1988 | Laughner et al. | 525/67 |
| 4,828,921 | 5/1989 | Witman et al. | 428/412 |

OTHER PUBLICATIONS

Lexan ® Polycarbonate Resin Properties Guide 1988, High Flow (HF) Resins.

Lexan ® Polycarbonate Resin Properties Guide, 1988, Business Equipment (BE) Resins.

*Primary Examiner*—Theodore E. Pertilla
*Attorney, Agent, or Firm*—Martin B. Barancik

[57] ABSTRACT

A composition comprising an admixture of
(a) an aromatic polycarbonate of intrinsic viscosity of from about 0.35 to about 0.41 dl/g, measured in methylene chloride at about 25° C., said aromatic polycarbonate chain terminated with an endcapping agent which provides the polycarbonate with improved ductility and higher Tg when compared to a paratertiary butyl phenol encapped polycarbonate of the same intrinsic viscosity;
(b) a core/shell copolymer comprising a conjugated diene with à Tg of less than or equal to $-10°$ C. as the core, said core being about 50 to 90 wt. percent of the core/shell polymer, and grafted thereon a shell comprised of an alkylalkacrylate and a styrenic, the core/shell copolymer present in such quantities to render the said composition ductile in the room temperature $\frac{1}{8}$ inch thickness Notched Izod test system under ASTM D-256, and
(c) a flame retardant combination comprising a flame retardant salt, said combination in quantities sufficient to achieve a UL-94 V-0 or V-1 rating in a molded part 90 mils thick.

11 Claims, No Drawings

COMPOSITION

BACKGROUND OF THE INVENTION

Aromatic carbonate resins such as polycarbonate resins are thermoplastic resinous materials possessing many excellent physical and chemical properties which render them useful in a wide range of applications. They exhibit, for example, excellent properties of toughness, impact resistance, heat resistance and dimensional stability, optical clarity or non-opaqueness, and physiological inertness. Because of their excellent property spectrum, polycarbonate resins are used in various utilities including molded and extruded articles. A particular application wherein thermoplastics have found significant use is in housings for business equipment. Such housings should generally be thin, lightweight, impact resistant, heat resistant, flame resistant and preferably have a low gloss so as to be pleasing to the eye over long periods of time. Polycarbonates have been used in numerous business equipment applications wherein relatively thick housings can be employed. However, wherein thinner housings must be employed, polycarbonates have not faired as successfully. The melt viscosities of polycarbonates are generally high, therefore making it more difficult to mold thin parts. When low viscosity, low molecular weight polycarbonates are employed, the article tends to be brittle as shown by ⅛ inch Notched Izod impact testing. Accompanying this brittleness is the difficulty in flame retarding a low viscosity polycarbonate, particularly with respect to dripping and flame in thin sections. Such polycarbonates lack melt strength at the temperatures of flame, thereby making it difficult to pass the Underwriter Laboratory flaming drip criteria to qualify as V-1 or V-0. Additionally, the polycarbonate generally has a glossy exterior upon molding. The properties required for business machine housings are also desirable for other electrical containing or enclosure device housings. Examples of such housings include letter holders/mailboxes and postal boxes.

Boutni, U.S. Pat. No. 4,767,818 issued to General Electric Company allegedly solved many of the problems of utilizing polycarbonate for business equipment housings. The solution disclosed in Boutni was to employ a low molecular weight polycarbonate with an admixture of a small percent of a random block copolymer having polycarbonate blocks and diorganosiloxane blocks or a block copolymer of a vinyl aromatic and an alkyl-diene in combination with a flame retardant combination comprising a flame retardant salt. The combination is in quantities sufficient to achieve V-0 or V-1 in a part 93 mils thick and a composition having a gloss of less than 80 as measured by a Gardner gloss meter at 60° gloss. This composition was placed into the marketplace as a composition useful for molding into business equipment housings. In certain applications, these compositions developed specific problems which limited their usefulness for business equipment housings. These problems included cracking, delamination and insufficient impact resistance.

A new composition of matter has been invented which meets the requirements necessary for successful marketplace performance and overcomes the specifically named disadvantages. Additionally, it has increased melt stability which allows the omposition to be processed at higher temperatures, thereby expanding the processing window available to molders of business equipment.

SUMMARY OF THE INVENTION

In accordance with the invention there is a composition comprising (a) aromatic polycarbonate with an intrinsic viscosity measured in methylene chloride at 25° C. of from about 0.35 dl per gm to about 0.41 dl per gm, said aromatic polycarbonate chain terminated with a chain terminating agent which provides the aromatic polycarbonate with improved ductility when compared to a para-tertiary butyl phenol endcapped aromatic polycarbonate of the same viscosity;

(b) a core/shell copolymer comprising a conjugated diene with a Tg of less than or equal to $-10°$ C. as the core, said core being about 50 to 90 wt. percent of the core/shell polymer, and grafted thereon a shell comprised of an alkylalkacrylate and a styrenic, the core/shell copolymer present in such quantities to render the said composition ductile in the room temperature ⅛ inch thickness Notched Izod test system under ASTM D-256, and (c) a flame retardant combination comprising a flame retardant salt said combination in quantities sufficient to achieve a UL-94 V-0 or V-1 in a molded part 90 mils thick.

DETAILED DESCRIPTION OF THE INVENTION

The aromatic polycarbonate useful herein can generally be prepared by the reaction of at least one dihydric phenol and a carbonate precursor such as phosgene, a haloformate, or a carbonate ester. Generally speaking, such polycarbonate resins may be typified as being comprised of at least one recurring structural unit comprised by the formula

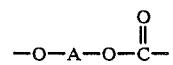

I.

wherein A is a divalent aromatic residue of the dihydric phenol employed in the polymer forming reaction.

The dihydric phenols which may be employed to provide such aromatic carbonate polymers may be represented by the general formula

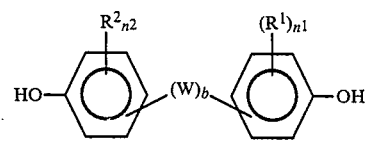

II.

wherein:

$R^2$ is independently selected from halogen, monovalent hydrocarbon, and monovalent hydrocarbonoxy radicals:

$R^1$ is independently selected from halogen, monovalent hydrocarbon, and monovalent hydrocarbonoxy radicals;

W is selected from divalent hydrocarbon radicals,

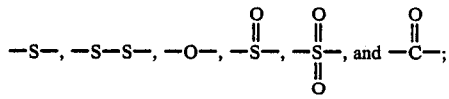

$n^2$ and $n^1$ are independently selected from integers having a value from 0 to 4 inclusive; and b is either zero or one.

The monovalent hydrocarbon radicals represented by $R^2$ an $R^1$ include alkyl, cycloalkyl, aryl, aralkyl and alkaryl radicals. The preferred alkyl radicals are those containing from about 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, naphthyl, and biphenyl. The preferred alkaryl and radicals are those containing from 7 to about 14 carbon atoms.

The preferred halogen radicals represented by $R^2$ and $R^1$ are chloro and bromo.

The divalent hydrocarbon radicals represented by W include the alkylene, alkylidene, cycloalkylene, and cycloalkylidene radicals. The preferred alkylene radicals are those which contain from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by $R^2$ and $R^1$ may be represented by the formula $-OR^3$ wherein $R^3$ is a monovalent hydrocarbon radical of the type described hereinafore for $R^2$ and $R^1$. Preferred monovalent hydrocarbonoxy radicals are the alkoxy and aryloxy radicals.

Some illustrative non-limiting examples of the dihydric phenols falling within the scope of Formula II include:

2,2-bis(4-hydroxyphenyl)propane(bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenol)cyclohexane;
1,1-bis(4-hydroxyphenyl)decane;
1,4-bis(4-hydroxyphenyl)propane;
1,1-bis(hydroxyphenyl)cyclododecane;
1,1-bis(3,5-dimethyl-4-hydroxyphenyl)cyclododecane
4,4'-dihydroxydiphenyl ether;
4,4'-thiodiphenol;
4,4'-dihydroxy-3,3'-dichlorodiphenyl ether; and
4,4'-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

These aromatic polycarbonates can be manufactured by known processes, such as, for example and as mentioned above, by reacting a dihydric phenol with a carbonate precursor, such as phosgene, in accordance with methods as set forth in the above-cited literature and U.S. Pat. Nos. 4,018,750 and 4,123,436 incorporated herein by reference, or by transesterification processes such as disclosed in U.S. Pat. No. 3,153,008, incorporated by reference, as well as other processes known to those skilled in the art.

The usual chain terminators which can be employed in preparing a polycarbonate cannot be employed in this composition and still obtain the ductility results obtained with the further composition components. Examples of typical chain terminators which do not provide sufficient ductility when present as chain terminators for polycarbonate in association with the core/shell impact modifier include phenol and paratertiary butyl phenol. Chain terminating compounds which do provide the required ductility include compounds such as para-cumyl phenol, chromanyl compounds such as those of U.S. Pat. No. 3,697,481 and ortho and para isooctyl phenol or ortho and para isononyl phenol, for example.

It is possible to employ two or more different dihydric phenols or a copolymer of a dihydric phenol with glycol or with a hydroxy or acid terminated polyester or with a dibasic acid in the event a carbonate copolymer or interpolymer rather than a homopolymer is desired for use in the preparation of the polycarbonate mixture of the invention. Branched polycarbonates are also useful, such as those described in U.S. Pat. No. 4,001,184, incorporated herein by reference. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a homopolymer derived from 2,2-bis(4-hydroxyphenyl) propane (bishpenol-A).

As mentioned previously, a prior formulation designed for business equipment housings exhibited limited utility in certain situations due to cracking, decreased practical impact resistance, and delamination. These problems have been overcome by utilizing a new and distinct impact modified polycarbonate composition.

The impact modifier employed in the composition of the invention is a core/shell copolymer comprising a conjugated diene with a Tg less than or equal to $-10°$ C. as the core. The conjugated diene which can be employed as the core includes polymerized butadiene or isoprene, preferably butadiene. The core is from about 50–90 wt. percent of the core/shell polymer preferably about 55–80 wt. percent. The core portion of the polymer need not be comprised solely of the polymerized diolefin; however at least 50 wt. percent of the core should be the polymerized diolefin, e.g. butadiene. Other polymerized monomers which may be present in the core include styrene, butyl acrylate, and other acrylate monomers. The shell material is comprised of at least two polymerized monomers, an alkylalkacrylate and a styrenic. Examples of an alkylalkacrylate include methylmethacrylate, ethylmethacrylate, butylmethacrylate and the like. Methylmethacrylate is preferred. Examples of a styrenic include styrene, alpha-methylstyrene, alpha-ethylstyrene, o, m, or p, -butylstyrene ortho-methylstyrene, p-methylstyrene, p-propylstyrene, 1-ethylene naphthalene and the like. Styrene is preferred. Other polymerized monomers which may be present in the shell include acrylates such as -methyl or ethyl acrylates. Polymerized methylmeth- acrylate and styrene are the preferred shell materials. The shell accounts for about 10–50 wt. percent of the core/shell polymer, preferably about 5–25 wt. percent of each of the methylmethacrylate and styrene. Cross-linking and grafting agents may also be present in the core and/or shell. Examples of such agents include 1,3 butylene glycol-dimethyacrylate, allylacrylate, (meth) acrylic acid vinyl esters, triallyl cyanurate, divinylbenzene and the like. Acrylonitrile or meth-acrylonitrile are not present in the shell phase of this invention.

Specific polymers which can be used in accordance with the invention include KM653 and like products available from Rohm and Haas, MM653 is an MBS with about 70-73 wt. percent butadiene (core), 12 wt. percent methylmethacrylate and 15 wt. prcent styrene. There is a sufficient amount of cross-linker to give at least 96.9 wt. percent insolubles in acetone. Kane Ace®B-56, available from Kaneka Americaor Kanegafuchi, is an MBS with about 66 wt. percent butadiene, 20 wt. percent methylmethacrylate and 14 wt. percent styrene and a sufficient amount of cross-linker to give at least 92 wt. percent of insolubles in acetone. Further MBS polymers include the Metablen®C Series Impact Modifiers (C-202, C-201, C-202C and C-223) commercially available from M&T Chemicals Inc., Acryloid®KM and EXL Series Impact Modifiers (KM581, KM436 and KM680, ELX2691, EXL2607 and EXL2647) available from Rohm & Haas Chemical Company; and Kane Ace®B-56 available from Kaneka America or Kanegafuchi Chemical Ind. Co. Ltd.

The preferred core/shell polymer overall is methylmethacrylate butadiene styrene, hereinafter abbreviated as MBS, the specific one being Kane Ace® B-56 most preferably made in Japan or Texas.

The core/shell polymer is employed in the compositions of this invention in an amount sufficient to bring about ductility of the composition in the room temperature ⅛ inch Notched Izod test of ASTM D-256. By ductility is meant a ductile mechanism of break in all five samples used in the test system. This is shown by the superscript 100 following the actual number. Quantities beyond about 12, preferably about 8 wt. percent generally do not bring about higher impact resistance and can cause undesirable side effects such as incompatibility as shown by delamination in the molded part and/or poor flame resistance. Quantities less than about 3 wt. percent do not generally bring about sufficiently increased ductility. Preferably, the core/shell polymer is from about 4 to about 8 wt. percent of the polycarbonate.

The flame retardant combination which achieves a UL-94, V-0 or V-1 in 90 mils thickness molded parts comprises a flame retardant salt. Such salts are generally inorganic or organic in nature and, when the latter, are preferably the sulfonate salts such as described in U.S. Pat. No. 3,775,367, assigned to Bayer or the aromatic sulfonate salts such as those described in U.S. Pat. Nos. 3,940,366; 3,933,734; 3,948,851; 3,926,908 and 3,909,490, assigned to General Electric Company. Alkali metal salts are preferred. The most preferred salt system is the metallic salt of a sulfonated diphenylsulfone, particularly the potassium salt. Quantities of flame retardant salt of from about 0.1 to 1.0 pph of the polycarbonate can be employed. Depending upon the type and quantity of the core/shell polymer used to enhance the impact resistance of the composition, various quantities of anti-drip agent should also be employed. Examples of such anti-drip agents include the fluorinated polyolefins such as polytetrafluoroethylene, preferably in its fibrile form, such as TEFLON® 30 resin, available from DuPont, and other agents such as bromine attached to an aromatic nucleus, for example, a tetrabrominated bisphenol-A polycarbonate copolymer or a brominated bis- phthalimide. Other well known anti-drip agents for polycarbonate can be used alone or in combination with other agents, for example, a siloxane fluid such as DF-1040, an organic siloxane fluid available from General Electric. The presence of these anti-drip agents allow the molded composition to register better than V-2 since both V-0 and V-1, in the Underwriter Laboratory's test system require the absence of the non-flaming drips.

The composition of the invention can be admixed and molded under conditions taking into account the substantially lower molecular weight of the polycarbonate and the greater stability of the melt system, particularly when the salt of a sulfonated diphenyl sulfone is present. The various components are admixed in the solid state and extruded at a temperature of from about 475° F. to about 525° F. and molded at a temperature of from about 475° F. to about 525° F.

Below are examples of the invention and comparative examples showing the results achieved using other potential impact modifiers and endcapped polycarbonates. The invention examples are intended to illustrate rather than narrow the scope of the invention.

EXAMPLE I

The following comparative examples were run utilizing a bisphenol-A polycarbonate of intrinsic viscosity 0.36 measured at 25° C. in methylene chloride solvent. The polycarbonate is encapped with paratertiary butyl phenol. Also present in the formulation as measured by the polycarbonate were 0.6 parts per 100 of a mold release agent, 0.6 parts per 100 of sodium trichloro benzene sulfonate flame retardant salt, 0.6 parts per 100 of a solid concentrate of 20 wt. percent polytetrafluoroethylene in 80 wt. percent of polycarbonate, 0.6 parts per 100 of tetrabromo bisphenol-A polycarbonate, 0.3 parts per 100 of a hindered phenol Irgonox® 1076 obtained from Ciba-Geigy, 0.2 parts per 100 of a thioester and 0.1 parts per 100 of a phosphite. Additionally present in the composition were the specific amounts of the impact modifiers as noted below. B56 has been previously described. KM330 is a core/shell polymer obtained from Rohm & Haas which is approximately 80 wt. percent of n-butyl acrylate core and 20 wt. percent of methylmethacrylate shell in which there are also small quantities of cross-linking agents and graft-linking agents. The styrene butadiene copolymer (SB) is Stereon® 840A obtained from Firestone. LR is a random block copolymer of bisphenol-A polycarbonate and dimethyl siloxane wherein the wt. percent of the dimethyl siloxane is about 43 wt. percent of the copolymer.

The test systems utilized to evaluate the compositions were Underwriter Laboratory 94, a well known test system measuring the flammability of the compositions, an Izod impact test under ASTM D-256, a double gate (DG) Izod impact tested based upon a double gated entry into a mold wherein there is a knit line present in the molded piece, the Dynatup measurement of impact resistance was performed under ASTM D-3763-85 test system and the distortion temperature under load at 264 PSI was performed according the ASTM D-648. K.I. is Kasha Index and is a measurement of the flowability of the melt. The lower the number is the higher the flow see U.S. Pat. No. 4,465,820, however the temperature at which the measurement is made is 250° C. rather than 300° C. The results are on the following page.

TABLE I

|  | A | B | C | D | E |
|---|---|---|---|---|---|
| Rubber | KM330 6 pph | SB 6 pph | LR 6 pph | B-56 6 pph | B-56 8 pph |
| UL 94 90 mil | HB | HB | V-2 | V-0 | V-1 |
| Ave % FOT | 8.0 | 11.9 | 4.6 | 4.3 | 5.1 |
| Range % | 2.6–32.3 | 11.6–41.1 | .7–12.0 | 2.7–6.4 | 1.0–20.0 |
| ⅛ Inch Notched Izod Ft-lb/in | $7.4^{100}$ | $4.1^{0}$ | $2.0^{0}$ | $4.5^{0}$ | $6.3^{80}$ |
| DG Izod Ft-lb/in | $17.6^{0}$ | $0.6^{0}$ | $5.9^{0}$ | $2.1^{0}$ | $10.6^{20}$ |
| Dynatup (RT) Ft-lb/ Max 1d | $18.7^{100}$ | $17.7^{80}$ | — | $20.3^{100}$ | $17.5^{100}$ |
| DTUL 264 PSI (°F.) | 254 | 254 | 262 | 244 | 242 |
| KI6 mil (250° C.) | 5090 | 4210 | 3280 | 3760 | 4740 |

The KM330 provided the best overall impact resistance; however, it totally failed the flame retardant requirements necessary for the claimed invention. The styrene butadiene not only failed the flame retardant requirements but also was brittle in the impact resistance testing. The LR impact modifier did not meet the flame retardant characteristics and was very low and brittle with respect to impact resistance. The B-56 in both quantitites met the flame retardant requirement but was brittle with respect to the impact resistance requirement in the Notched Izod test system. It should be noted that the polycarbonate employed was of the appropriate intrinsic viscosity but utilized a chain terminator which was shown to be inappropriate when in combination with the impact modifiers.

EXAMPLE II

Bisphenol-A polycarbonate of intrinsic viscosity 0.38 based on measurements in a methylene chloride solvent at 25° C. and encapped with paracumyl phenol was utilized in the following experiments. Based on the weight of the polycarbonate all of the compositions also contained 0.6 parts per 100 of a mold release agent, 0.1 parts per 100 of a phosphite, 0.2 parts per 100 of thioester and 0.3 parts per 100 of a hindered phenol. All of the experimental compositions also contained 2 parts per 100 of titanium dioxide except experiment 5. The remainder is as shown in the Table below, the weight percents or the parts per 100 based upon the quantity of polycarbonate. All of the test systems utilized in the table below were previously identified in Example I. The only additional system, MFI, is a measurement of the melt flow index according to ASTM D-1238. Composition Example F is the control without the B-56 but containing the pigment titanium dioxide.

perature and indeed falls off even further at reduced temperature. The ¼ inch Notched Izod as well as the double gate Izod also shows brittleness.

In comparison all of the compositions having the varying amounts of the core/shell impact modifier MBS show ductility at both the ⅛ inch Notched Izod room temperature measurement and the ¼ inch Notched Izod room temperature measurement as well as the double gate Izod. At reduced temperatures in the ⅛ inch Notched Izod system the difference is startling. The addition of 20 parts per 100 of branched polycarbonate resin shows that the basic measurements essentially remain the same. The example without the titanium dioxide pigment, Example 5, is present to show the standard type values which one would expect without the pigment. It should be noted that the pigment reduces the Notched Izod impact resistance of the system substantially when there is no impact modifier present. However even with the pigment present, the presence of the MBS modifier brings about excellent ductility and substantially increased impact resistance.

EXAMPLE III

The following is a laboratory test that quantifies the minimum strain required to initiate crazing or microcracking in a molded part. The test utilizes a Bergen Strain jig with an elliptical surface. Clamps fasten the test specimen in place so as to conform to the jig surface and restrict movement. The equation to calculate the amount of induced strain is $$e = 0.03(1 - 0.0364x^2)^{-3/2} xd$$

where
  e = strain

TABLE II

|  | 1 | 2 | 3 | 4 | 5 | F |
|---|---|---|---|---|---|---|
| B-56 | 4 phr | 6 phr | 8 phr | 6 phr | 6 phr | 0 |
| Branch Lexan | — | — | — | 20 phr | — | — |
| Dynatup Ft-lb |  |  |  |  |  |  |
| (max load) (RT) | $29.39^{100}$ | $26.4^{100}$ | $26.4^{100}$ | $26.9^{100}$ | $34.1^{100}$ | $38.4^{100}$ |
| −30° C. | $31.2^{75}$ | $29.2^{40}$ | $28.1^{60}$ | $34.7^{100}$ | $19.9^{80}$ | $30.6^{25}$ |
| −50° C. | $32.6^{0}$ | $33.3^{0}$ | $26.8^{0}$ | $33.7^{20}$ | $20.6^{0}$ | $38.2^{0}$ |
| HDT at 264 PSI (°F.) | 242 | 242 | 244 | 258 | 242 | 242 |
| .125 Notched Izod |  |  |  |  |  |  |
| (RT)FT-lb/in | $10.7^{100}$ | $9.4^{100}$ | $9.7^{100}$ | $9.7^{100}$ | $10.1^{100}$ | $8.4^{60}$ |
| −10° C. | $9.2^{60}$ | $9.4^{100}$ | $8.7^{100}$ | $9.9^{100}$ | $8.4^{80}$ | $0.8^{0}$ |
| −30° C. | $5.8^{0}$ | $6.1^{0}$ | $7.2^{60}$ | $9.0^{20}$ | $4.0^{0}$ | $1.1^{0}$ |
| .250 Notched Izod |  |  |  |  |  |  |
| (RT)FT-lb/in | $7.5^{100}$ | $7.9^{100}$ | $8.0^{100}$ | $8.9^{100}$ | $7.0^{100}$ | $1.7^{0}$ |
| DG Izod (RT)FT-lb/in | $23.9^{100}$ | $23.0^{100}$ | $21.3^{100}$ | $24.8^{100}$ | $23.3^{100}$ | $24.4^{20}$ |
| MFI (300° C.) | 41 | 37 | 37 (33) | 28.7 | 41 | 55 |

In comparative Example F, as shown by the data, the ⅛ inch Notched Izod test system is brittle at room temx = distance to the craze from a perpendicular drawn from the edge of the jig d = thickness of the specimen This test is described in detail, see R. L. Bergen, Jr., SPE J.24(8),77 (1968).

For evaluation purposes, injection molded bars designed to minimize residual strains, having dimensions of 5×0.5×0.125 inches were used. These specimens were affixed to the Bergen Strain jig, annealed for 12 hours at 90° C. and cooled for a number of hours at 23° C. Craze formulation was observed and the associated strain was calculated. A cracked part, complete failure, was considered to perform poorer than those exhibiting crazes since the material was unable to maintain the induced strain.

In the tests below bisphenol-A polycarbonate of 0.36 intrinsic viscosity was endcapped with different groups. Aging was 12 hours at 90° C. and cooling at 23° C. for two hours.

| End Cap | Minimum Strain to to Craze |
|---|---|
| para-cumylphenol | .0148 |
| p-tertiary butyl phenol | Cracked |
| phenol | Cracked |

This data demonstrates the increased resistance to cracking noted with a para-cumylphenol endcap compared to the standard para-tertiary butyl phenol or phenol encaps in polycarbonate.

In the following experiment, compositions with para-cumylphenol encapped bisphenol-A polycarbonate of varying intrinsic viscosities were molded with 6 pph of "B-56" previously identified or 6 pph of "LR", that is a block copolymer of bisphenol-A polycarbonate and dimethyl organosiloxane units having 43 wt. percent of the siloxane.

The minimum strain to craze was observed.

| Polycarbonate I.V. Dl/g* | Impact Modifier 6 pph | Minimum strain to Craze |
|---|---|---|
| .382 | B-56 | .0217 |
| .377 | LR | .0205 |
| .398 | B-56 | No craze >.139 |
| .396 | LR | .0247 |
| .417 | B-56 | No craze >.139 |
| .414 | LR | No craze >.139 |
| .435 | B-56 | No craze >.139 |
| .429 | LR | No craze >.139 |

*methylene chloride at 25° C.

It should be noted that 0.139 is the maximum limit of the test.

These tests clearly show the significance of the claimed intrinsic viscosity.

What is claimed is:

1. A composition comprising an admixture of
  (a). an aromatic polycarbonate of intrinsic viscosity of from about 0.35 to about 0.41 dl/g, measured in methylene chloride at about 25° C., said aromatic polycarbonate chain terminated with an endcapping agent which provides the polycarbonate with improved ductility when compared to a paratertiary butyl phenol encapped polycarbonate of the same intrinsic viscosity;
  (b). a core/shell copolymer comprising a conjugated diene with a Tg of less than or equal to −10° C. as the core, said core being about 50 to 90 wt. percent of the core/shell polymer, and grafted thereon a shell comprised of an alkylalkacrylate and a styrenic, the core/shell copolymer present in such quantities to render the said composition ductile in the room temperature ⅛ inch thickness Notched Izod test system under ASTM D-256, and
  (c). a flame retardant combination comprising a flame retardant salt, said combination in quantities sufficient to achieve for the composition a UL-94 V-0 V-1 rating in a molded part 90 mils thick.

2. The composition in accordance with claim 1 wherein the aromatic polycarbonate has an intrinsic viscosity of from about 0.36 to 0.40.

3. The composition in accordance with claim 1 wherein the chain terminating agent is selected from the group consisting of a chromanyl compound, para cumyl phenol, o or p-isooctylphenol and o or p-isononylphenol.

4. The composition in accordance with claim 1 wherein the core/shell copolymer is present in quantities less than or equal to about 12 wt. percent of the aromatic polycarbonate.

5. The composition in accordance with claim 4 wherein the core/shell copolymer is present in quantities of about 3 wt. percent of the aromatic polycarbonate.

6. The composition in accordance with claim 4 wherein the conjugated diene is butadiene, the alkylalkacrylate is methylmethacrylate and the styrenic is styrene.

7. The composition in accordance with claim 6 wherein the butadiene is from about 50–90 wt. percent of the core/shell copolymer and the methylmethacrylate and styrene are each about 5 to about 25 wt. percent of the core/shell copolymer.

8. The composition in accordance with claim 7 where there is an absence of acrylonitrile.

9. The composition in accordance with claim 7 where there is a graft-linking agent present in the core/shell copolymer.

10. The composition in accordance with claim 7 wherein there is a cross-linking agent present in the core.

11. The composition in accordance with claim 7 wherein the cross-linking agent is present in the shell.

* * * * *